United States Patent
Matsushita

(10) Patent No.: US 7,618,146 B2
(45) Date of Patent: Nov. 17, 2009

(54) MULTISCREEN DISPLAY SYSTEM, MULTISCREEN DISPLAY METHOD, LUMINANCE CORRECTION METHOD, AND PROGRAMS

(75) Inventor: Tomoyoshi Matsushita, Tokyo (JP)

(73) Assignee: NEC Viewtechnology, Ltd., Minato-ku, Tokyo (JP)

( * ) Notice: Subject to any disclaimer, the term of this patent is extended or adjusted under 35 U.S.C. 154(b) by 484 days.

(21) Appl. No.: 11/176,279

(22) Filed: Jul. 8, 2005

(65) Prior Publication Data
US 2006/0012759 A1      Jan. 19, 2006

(30) Foreign Application Priority Data
Jul. 16, 2004      (JP)      ............... 2004-209506

(51) Int. Cl.
H04N 9/12      (2006.01)
G03B 21/14      (2006.01)
(52) U.S. Cl. .................... 353/94; 353/85; 348/745; 345/1.3
(58) Field of Classification Search ............ 353/30, 353/94; 348/745, 747, 806; 345/1.3
See application file for complete search history.

(56) References Cited

U.S. PATENT DOCUMENTS

| | | | | |
|---|---|---|---|---|
| 5,136,390 | A * | 8/1992 | Inova et al. ................ | 348/383 |
| 6,310,650 | B1 * | 10/2001 | Johnson et al. ............ | 348/383 |
| 6,377,306 | B1 * | 4/2002 | Johnson et al. ............ | 348/383 |
| 6,456,339 | B1 * | 9/2002 | Surati et al. ............... | 348/745 |
| 7,292,207 | B1 * | 11/2007 | Naegle et al. .............. | 345/1.3 |
| 7,339,625 | B2 * | 3/2008 | Matthys et al. ............. | 348/383 |
| 2003/0142116 | A1 | 7/2003 | Mochizuki | |
| 2003/0160946 | A1 * | 8/2003 | Yamanaka ................. | 353/30 |
| 2003/0227599 | A1 * | 12/2003 | Weissman et al. .......... | 353/94 |
| 2005/0140568 | A1 * | 6/2005 | Inazumi ..................... | 345/1.3 |
| 2007/0103652 | A1 * | 5/2007 | Nijim et al. ................ | 353/94 |

FOREIGN PATENT DOCUMENTS

| | | |
|---|---|---|
| EP | 1 331 815 | 1/2003 |
| JP | 2-228180 | 9/1990 |

(Continued)

OTHER PUBLICATIONS

Japanese Office Action dated Sep. 10, 2008 with Partial English Translation.

*Primary Examiner*—William C Dowling
(74) *Attorney, Agent, or Firm*—McGinn Intellectual Property Law Group, PLLC

(57) ABSTRACT

Picture signals that indicate a screen that are supplied as output from a signal generation source are divided by a picture splitting device into picture signals of a plurality of screens for displaying a large screen and then supplied to a gradation conversion LUT unit in a luminance correction circuit. Based on display position information from a timing circuit, a coefficient arrangement control unit implements a non-linear arrangement of gain coefficients for gradation control that is carried out in picture element units. Based on the display position information from the timing circuit, the gradation conversion LUT unit adjusts display positions such that areas in which the projected display areas of the plurality of projectors overlap match with areas that are the objects of gradation conversion, and implements a luminance level conversion in picture element units of input signal levels of picture signals that have been split using the arrangement of gain coefficients for gradation control.

20 Claims, 4 Drawing Sheets

FOREIGN PATENT DOCUMENTS

| | | |
|---|---|---|
| JP | 3-085879 | 4/1991 |
| JP | 5-173523 | 7/1993 |
| JP | 5-300452 | 11/1993 |
| JP | 5-300453 | 11/1993 |
| JP | 7-50795 | 2/1995 |
| JP | 7-64522 | 3/1995 |
| JP | 10-178605 | 6/1998 |
| JP | 11-146307 | 5/1999 |
| JP | 2001-249652 | 9/2001 |
| JP | 2001-306024 | 11/2001 |
| JP | 2002-148713 | 5/2002 |
| JP | 2002-244200 | 8/2002 |
| JP | 2002-268625 | 9/2002 |
| JP | 2003-216130 | 7/2003 |
| JP | 2004-23242 | 1/2004 |

* cited by examiner (1) electrical correction of edges of display (when input image is white)

(2) optically distorted image (before overlap projection)

(3) optically distorted image (after overlap projection)

position A : result=(5)

position B : result=(4)

(4) bad effect of optical distortion (5) output of luminance correction (1) non-linear gradation conversion (electrical correction)

(2) projected display of the above (1) (optical distortion is present)

(3) overlapping of the above (2)

MULTISCREEN DISPLAY SYSTEM, MULTISCREEN DISPLAY METHOD, LUMINANCE CORRECTION METHOD, AND PROGRAMS

BACKGROUND OF THE INVENTION

1. Field of the Invention

The present invention relates to a multiscreen display system, a multiscreen display method, a luminance correction method, and programs.

2. Description of the Related Art

As an example of the prior art, in a multiscreen system, an uneven luminance correction circuit for correcting a video signal is provided in an enlarging distributor. The uneven luminance correction circuit is composed of a LUT (Look-Up Table), divides the addresses of the LUT into (n) parts in accordance with the enlarging ratio of the core, and corrects the uneven luminance for each core by means of the LUT data that have been divided into (n) portions (Japanese Patent Laid-Open Publication No. 50795/95). The following explanation regards the luminance correction method of the prior art with reference to FIG. 1.

In FIG. 1 (1), in order to make uniform the luminance distribution of the areas in which the image displays that are projected by each projector overlap, a means is adopted in the method of the prior art for reducing the luminance levels of the overlapping portions as the edges of the image are approached, and gradation conversion coefficients are determined according to the distance from the image edges. As a method of the prior art for reducing unevenness in luminance in overlapping areas when optical distortion occurs, gradation conversion of the overlapping areas is carried out after first passing the image through an image distortion correction circuit realized by geometric distortion correction circuits.

One disadvantage of the geometric distortion correction method of the prior art is the large circuit scale, and a major disadvantage is the attendant deterioration in image quality of the output image. Although it is typical to use this geometric distortion correction for correcting distortion when an image is projected onto a surface that is not planar, it is not effective to use the geometric distortion correction circuit for only correcting the distortion of the optics when projecting an image onto a planar screen.

In the electrical luminance correction method of the prior art, when, for example, a single image is divided vertically and a video signal then projected and displayed using two projectors, electrical gradation control is carried out at intervals of any fixed number of picture elements in the horizontal direction from the right and left edges of the display image, and as a result, when the two projectors have optical distortion, it was impossible to eliminate the conspicuousness of the uneven luminance of overlapping regions of white levels, as shown in FIG. 1 (4).

SUMMARY OF THE INVENTION

It is an object of the present invention to provide a gradation conversion method, a multiscreen display method, a multiscreen display system, and programs that can realize uniform luminance and that compensate for the problems described above.

The multiscreen display system of the present invention uses a plurality of projectors and displays on a screen a single large screen in which a plurality of screens have been combined, the multiscreen display system being provided with a luminance correction circuit for, in areas of overlap of images that are projected on the screen, implementing a non-linear arrangement of gain coefficients for gradation control that is carried out in picture element units in gradation correction areas.

The multiscreen display system of the present invention may include: a picture splitting device for dividing the picture signals that indicate a single screen that are supplied as output from a signal generation source into picture signals of a plurality of screens for displaying a large screen; a timing circuit in the luminance correction circuit for generating display position information such that areas in which the projection display areas of a plurality of projectors overlap match with areas that are the object of gradation conversion; a coefficient arrangement control unit in the luminance correction circuit for, based on the display position information from the timing circuit, implementing a non-linear arrangement of gain coefficients for gradation control that is carried out in picture element units; a gradation conversion LUT unit in the luminance correction circuit for adjusting display positions based on the display position information from the timing circuit such that areas in which the projection display areas of a plurality of projectors overlap match with areas that are the object of gradation conversion, and then implementing, in picture element units, a luminance level conversion of input signal levels of the picture signals that have been split using the arrangement of the gain coefficients for gradation control; and projectors for displaying on a screen picture signals that have undergone the luminance level conversion.

The luminance correction method of the present invention is used in a multiscreen display system that uses a plurality of projectors to display on a screen a single large screen in which a plurality of screens have been combined; the luminance correction method implementing, in areas in which pictures that are projected onto a screen overlap, a non-linear arrangement of gain coefficients for gradation control that is carried out in picture element units in gradation control areas.

The multiscreen display method of the present invention is a method for using a plurality of projectors to display on a screen a single large screen in which a plurality of screens have been combined; the multiscreen display method including steps of: splitting picture signals that indicate a screen that are supplied as output from a signal generation source into picture signals of a plurality of screens for displaying the large screen; generating display position information such that areas in which the projection display areas of a plurality of projectors overlap match with areas that are the object of gradation conversion; based on the display position information, implementing a non-linear arrangement of gain coefficients for gradation control that is carried out in picture element units; based on the display position information, adjusting display positions such that areas in which the projection display areas of a plurality of projectors overlap match with areas that are the object of gradation conversion, and implementing, in picture element units, a luminance level conversion of the input signal levels of picture signals that have been split using the arrangement of gain coefficients for gradation control; and displaying on a screen the picture signals that have undergone the luminance level conversion.

A program of the present invention causes a computer to function as the above-described multiscreen display system.

A program of the present invention causes a computer to execute the above-described luminance correction method.

A program of the present invention causes a computer to execute the above-described multiscreen display method.

Thus, even when optical distortion is present in portions in which projected images overlap in a multiscreen display system that uses a plurality of projectors, the present invention implements luminance correction through non-linear arrangement control when using electrical gradation conversion coefficients such that uneven luminance is not conspicuous in areas of image overlap.

The present invention has the following effects:

By means of the luminance correction method of the present invention, the luminance distribution can be maintained at a fixed level in areas in which the projected image display of each of the projectors overlaps even in an environment in which optical distortion is present, and as a result, a picture that is free of seams can be displayed.

In addition, this correction is particularly effective when the areas of overlap are narrow with respect to the degree of optical distortion.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 2:
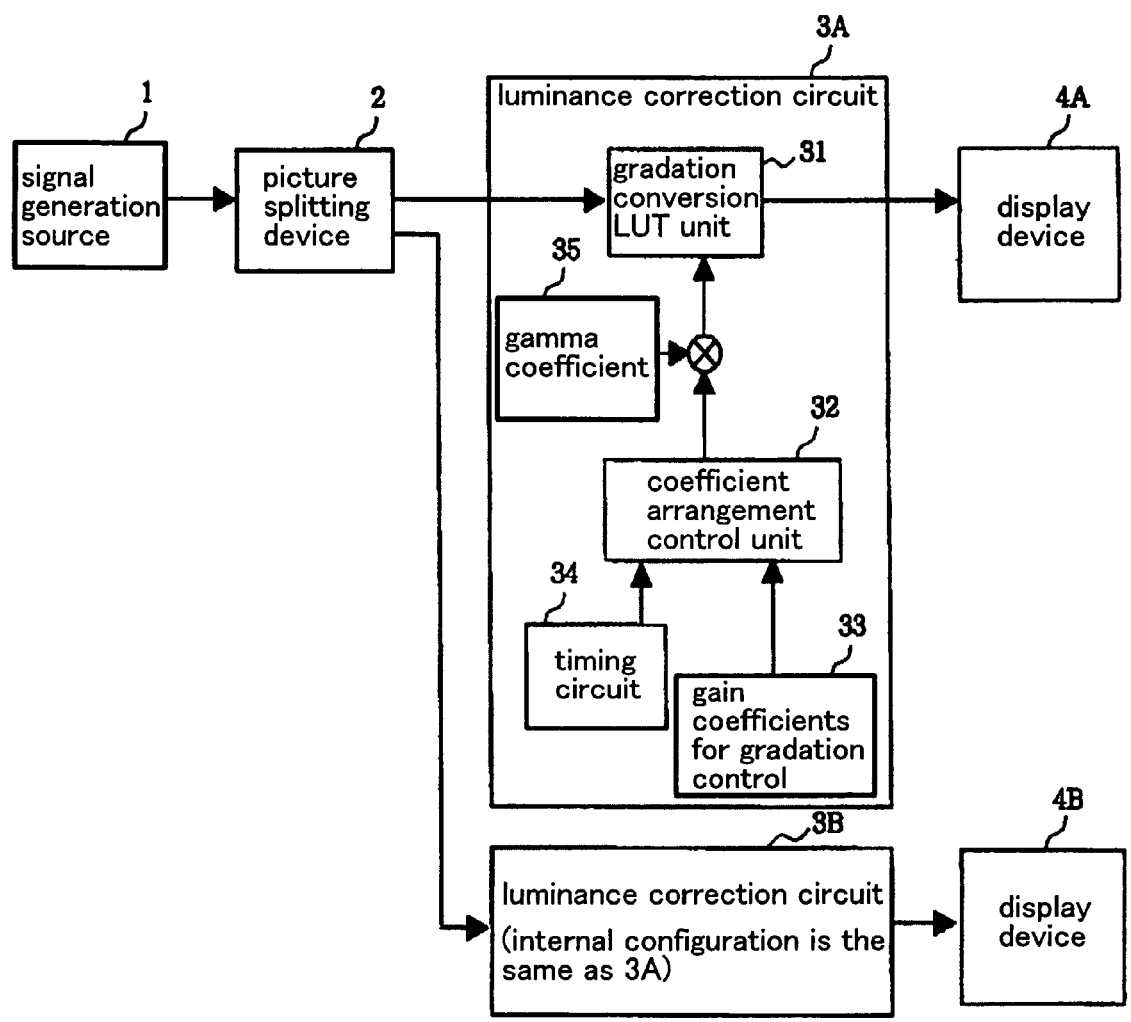
FIG. 2 is a block diagram showing the embodiment of a multiscreen display system of the present invention.

FIG. 2 is a block diagram showing an embodiment of the multiscreen display system of the present invention.

The multiscreen display system of the present embodiment is provided with: signal generation source 1, picture splitting device 2, luminance correction circuits 3A and 3B, and display devices 4A and 4B.

Because the internal configuration of luminance correction circuits 3A and 3B are identical, only the internal configuration of luminance correction circuit 3A is shown in the figure and explained.

Luminance correction circuit 3A uses a picture edge mixing method and includes: gradation conversion LUT unit 31 that is provided with signal level conversion LUT (Look-Up Table), and coefficient arrangement control unit 32. The signal level conversion LUT of this gradation conversion LUT unit 31 is a table for implementing, in picture element units, luminance level conversion of the input signal levels within a screen area.

Picture signals that indicate a screen that are supplied as output from signal generation source 1 are first split by means of, for example, picture splitting device 2 into picture signals of a plurality of screens for displaying a large screen, and then supplied to gradation conversion LUT unit 31 in luminance correction circuit 3A.

Timing circuit 34 in luminance correction circuit 3A generates display position information such that areas of overlap of the projected display areas of a plurality of projectors match with areas that are the object of gradation conversion.

Coefficient arrangement control unit 32, based on the display position information from timing circuit 34, implements a non-linear arrangement of gain coefficients 33 for gradation control that is carried out in picture element units.

Gradation conversion LUT unit 31, based on the display position information from timing circuit 34, adjusts the display positions such that areas of overlap of the projection display areas of a plurality of projectors match with the areas that are the object of gradation conversion, and then implements a conversion of luminance levels in picture element units of the input signal levels of the picture signals that have been split using the arrangement of gradation control gain coefficients 33.

Picture signals of the same bit width as the input of display device 4A for which luminance level has been thus converted are supplied to display device 4A, and then finally projected onto a screen by an optical process. Picture splitting device 2 of FIG. 2 or a picture splitting circuit is known to a person with ordinary skill in the art in the field, and further, is not directly related to the present invention, and a detailed explanation of the configuration is therefore here omitted.

The following explanation regards the operation of the present embodiment. Explanation first regards the operation of luminance correction circuit 3A with reference to the figure showing the projected picture image and luminance distribution.

Figure 1:
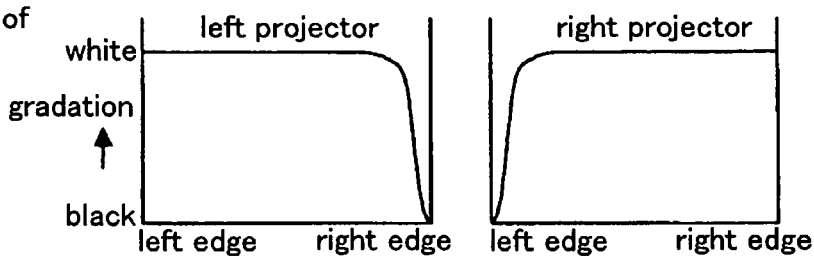
FIG. 1 is a view showing the electrical gradation conversion process of portions of overlap of the edges of the image that are projected by two projectors of the prior art that are arranged side by side.
Figure 1:
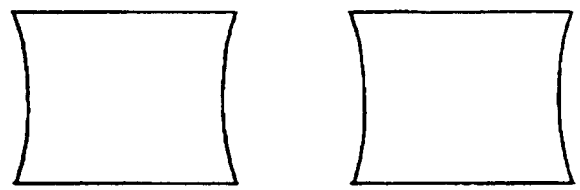
Figure 1:
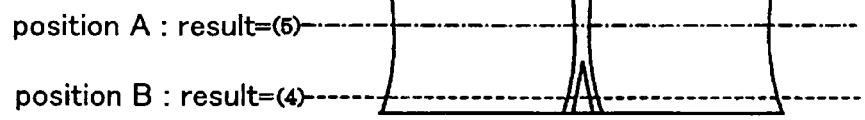
Figure 1:
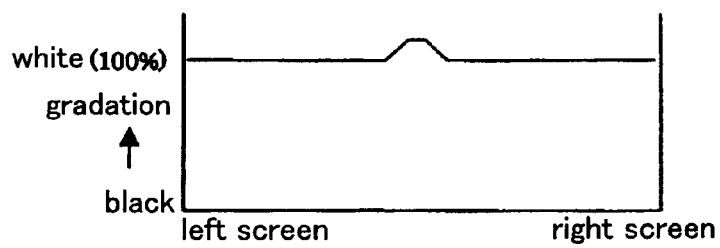
Figure 1:
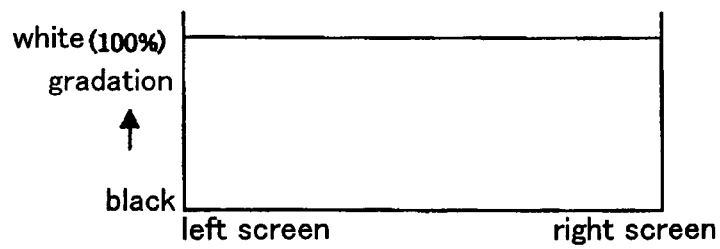

When, for example, two projectors are placed side by side, the electrical gradation conversion process of the portions of overlap of the projected picture images is typically carried out as shown in FIG. 1 (1). Preferably, the optical output that is obtained by this correction, i.e., the projected image, ideally maintains a uniform luminance distribution of the image as shown in FIG. 1 (5).

However, in the event of optical distortion as shown in FIG. 1 (2) that results from, for example, the lens of the projectors, if adjustments are made as shown in FIG. 1(3) such that the result at position A is a uniform luminance distribution as shown in FIG. 1 (5), the results at position B will not be uniform, as shown in FIG. 1 (4), and a vertical line having high luminance will be visible in the upper and lower portion of overlap in this example.

Figure 3:
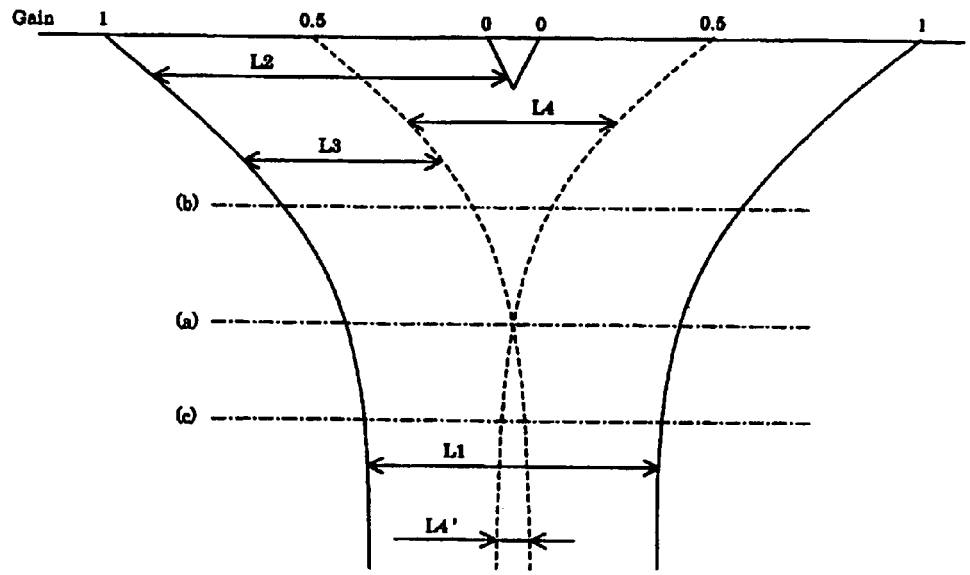
FIG. 3 is a view for explaining an actual example of luminance distribution.

The following explanation regards an actual example of the luminance distribution using FIG. 3. If the output luminance level y is shown as a function of input luminance level x that is represented as:

$$y = x^\gamma$$

gamma coefficient 35 in luminance correction circuit 3A of FIG. 2 that is used in the area of overlap must be made the same value as the above-described gradation control gain coefficient $\gamma$.

An example is here described in which gamma coefficient 35 is:

$$\gamma = 1$$

In the following explanation, the level of black is assumed to be 0, and the level of white is assumed to be 1.

If the width of the area in which two projected images overlap is L1 and the width of the area that is subjected to electrical gradation correction as shown in FIG. 1 (1) is L3, then when:

$$L3 = L1 \times 0.5$$

$$L1 - (2 \times L3) = 0 \qquad (a)$$

the gain value G (L4) of the L4 area and the gain value G (L3) of the L3 area are:

$$G(L4)=1$$

$$G(L3)=1$$

and the ideal state is obtained in which the luminance distribution is uniform as shown in FIG. 1 (5). However, in the event of optical distortion, when:

$$L1-(2\times L3)>0 \quad (b)$$

the value of gain G(L4) of the L4 area is:

$$G(L4)<1$$

and as a result, the luminance falls short of 1 and therefore darkens. On the other hand, when:

$$L1-(2\times L3)<0 \quad (c)$$

the value of gain G (L4') of the L4' area becomes:

$$G(L4')>1$$

and as a result, the luminance exceeds 1 and therefore brightens. Thus, in order to reduce the non-uniformity of the luminance distribution resulting from the effect of the above-described optical distortion, a method has typically been adopted for making the above-described luminance distribution uniform in which the gradation conversion at the positions of overlap is carried out after first correcting the image by means of a geometric distortion correction circuit.

In the case of using this method, however, the input picture signals must undergo a non-linear interpolation process, and this process not only necessitates large-scale circuitry, but also has the major disadvantage of causing deterioration of the output image.

In the luminance correction method of the present embodiment, control for implementing a non-linear arrangement of settings of gradation control gain coefficients 33 for each picture element in two-dimensional space is introduced into a method of the prior art that includes gradation conversion LUT unit 31, whereby gradation correction can be realized in which the luminance distribution of the overlapping areas is maintained uniformly.

Figure 4:
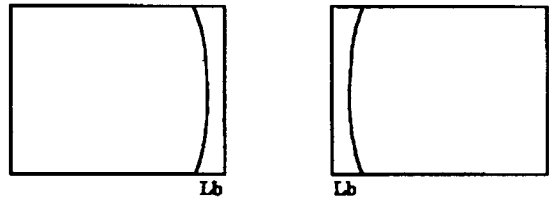
FIG. 4 is a view showing the non-linear gradation conversion process of the present invention.
Figure 4:
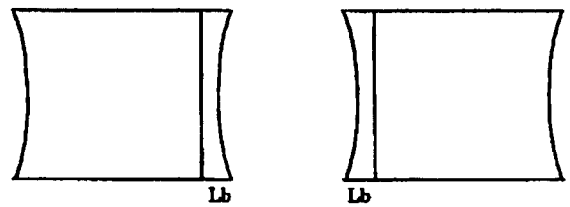
Figure 4:
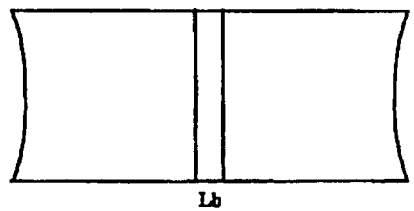
Figure 5:
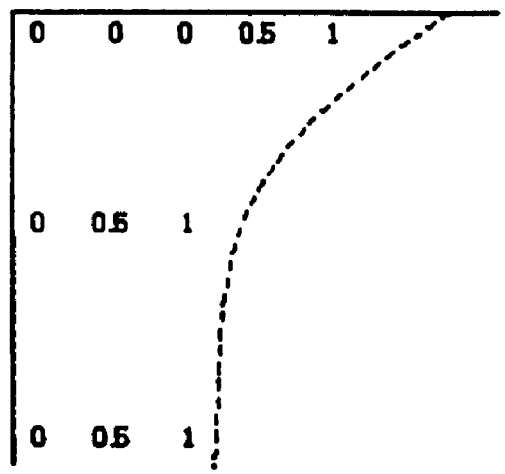
FIG. 5 shows an example of the arrangement of gain coefficients for gradation control in non-linear areas.
Figure 6:
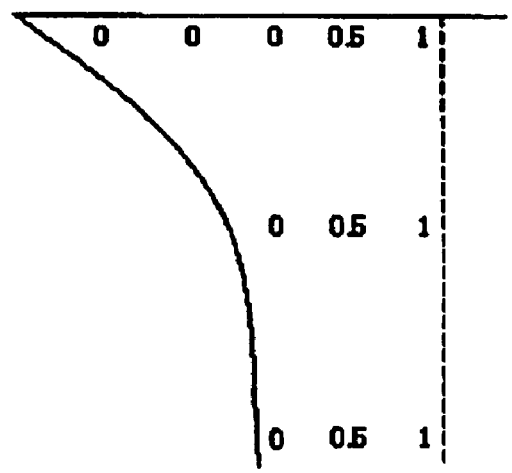
FIG. 6 shows an example of the coefficient distribution of projected images.

More specifically, when an overlap area Lb as shown in FIG. 4 (1) that is due to optical distortion at the time of projection is predicted, an arrangement in non-linear areas of gradation control gain coefficients 33 that are used in gradation conversion as in FIG. 5, which shows an enlargement of the upper left portion of the projected image on the right side, can obtain a coefficient distribution such as shown in FIG. 6 in the projected image (FIG. 4 (2)), and as a result, can make the luminance distribution uniform such as shown in FIG. 1 (5) in the overlap area (FIG. 4 (3)). The coefficients that are used in these figures are only one example, and in actuality, to the extent possible, the differences in gradation between adjacent picture elements are set to values in the range from 0 to 1 such that differences are not readily perceived.

FIG. 1 (5) shows the luminance level of white in the projector image projection display when the luminance correction method according to the present invention is used. Compared to the image projection display having conspicuous variations in luminance in the areas of image overlap such as FIG. 1 (4) that is obtained by the method of the prior art, in the present method, the non-linear arrangement of gain coefficients in the gradation correction areas of the areas of overlap of the projected image enables overlap areas that are inconspicuous even when optical distortion is present in the projected image.

When a multiscreen image is projected onto the entire screen, the results such as FIG. 1 (5) that are obtained in the overall projected image enable display in which uneven luminance is almost unperceivable.

Although the above-described arrangement of coefficients is determined by means of timing circuit 34 in luminance correction circuit 3A of FIG. 2, a method may be used in which a calculation device outside the projector is used and the coefficients that are obtained then written to gradation conversion LUT unit 31.

Although images are projected from two projectors and aligned in a horizontal direction in the above-described embodiment, the present luminance correction method may also be used when further arranging two more projectors that are aligned vertically to display a total of four images, and may further be used in applications that employ still more projectors. In relation to the parts of the above-described embodiment relating to circuits that are capable of implementing gradation conversion for each picture element of the input signal levels in one screen area, in the interest of reducing the capacity of the memory that makes up the LUT, a circuit configuration may be adopted that can store level conversion data for each of fixed picture elements, and a method may be employed by which the levels between these picture elements are guided by an interpolation circuit.

In addition, a program of the multiscreen display system according to the above-described embodiment of the present invention can cause a computer to function as the multiscreen display system.

A program of the luminance correction method according to the above-described embodiment of the present invention can cause a computer to execute the luminance correction method.

Finally, a program of the multiscreen display method according to the above-described embodiment of the present invention can cause a computer to execute the multiscreen display method.

While a preferred embodiment of the present invention has been described using specific terms, such description is for illustrative purposes only, and it is to be understood that changes and variations may be made without departing from the spirit or scope of the following claims.

What is claimed is:

1. A multiscreen display system, comprising:
   a plurality of projectors for displaying on a screen a single large image in which a plurality of images have been combined; and
   a luminance correction circuit for, in areas of overlap of said plurality of images that are projected on the screen, implementing a non-linear arrangement of gain coefficients for gradation control that is carried out in picture element units in gradation correction areas, said luminance correction circuit comprising a gradation conversion look up table (LUT) unit for adjusting display positions based on display position information from a timing circuit such that areas in which projection display areas of said plurality of projectors overlap match with areas that are an object of gradation conversion, and then implementing, in picture element units, a luminance level conversion of input signal levels of a plurality of picture signals that have been split using the non-linear arrangement of said gain coefficients for gradation control.

2. A multiscreen display system according to claim 1, further comprising a picture splitting device for splitting said plurality of picture signals that indicate said single large image that are supplied as output from a signal generation source into said plurality of picture signals of said plurality of images for displaying said single large image, wherein said luminance correction circuit further comprises said timing circuit and a coefficient arrangement control unit for, based on said display position information from said timing circuit, implementing said non-linear arrangement of said gain coefficients for gradation control that is carried out in said picture element units, and wherein said plurality of projectors display on said screen said plurality of picture signals that have undergone said luminance level conversion.

3. The multiscreen display system according to claim 2, further comprising:

an interpolation circuit for guiding levels between said picture element units, wherein said luminance correction circuit comprises a memory for storing level conversion data for said picture element units.

4. The multiscreen display system according to claim 1, wherein said non-linear arrangement of gain coefficients is determined by a calculation device disposed outside said luminance correction circuit, and wherein said gain coefficients are written to a gradation conversion look up table (LUT) unit.

5. A luminance correction method for use in a multiscreen display system, said luminance correction method comprising:

using a luminance correction circuit to implement, in areas in which a plurality of images that are projected onto a screen overlap, a non-linear arrangement of gain coefficients for gradation control that is carried out in picture element units in gradation control areas, wherein said multiscreen display system comprises a plurality of projectors for displaying on said screen a single large image in which said plurality of images have been combined, and wherein said gain coefficients are written to a gradation conversion look up table (LUT) unit of said luminance correction circuit that adjusts display positions based on display position information from a timing circuit.

6. The luminance correction method according to claim 5, wherein said non-linear arrangement of gain coefficients is determined by a calculation device disposed outside said luminance correction circuit.

7. The luminance correction method according to claim 5, wherein said gradation conversion look up table (LUT) unit of said luminance correction circuit implements, in said picture element units, a luminance level conversion of input signal levels of a plurality of picture signals that have been split using the non-linear arrangement of said gain coefficients for gradation control.

8. The luminance correction method according to claim 5, wherein the display positions are adjusted such that areas in which projection display areas of said plurality of projectors overlap match with areas that are an object of gradation conversion.

9. The luminance correction method according to claim 7, wherein the display positions are adjusted such that areas in which projection display areas of said plurality of projectors overlap match with areas that are an object of gradation conversion.

10. The luminance correction method according to claim 5, further comprising using a coefficient arrangement control unit of said luminance correction circuit to, based on said display position information from said timing circuit, implement said non-linear arrangement of said gain coefficients for gradation control that is carried out in said picture element units.

11. The luminance correction method according to claim 9, wherein said gradation conversion look up table (LUT) provides said gradation control such that a luminance distribution can be maintained at a fixed level in areas where said plurality of images have been combined.

12. A multiscreen display method for using a plurality of projectors to display on a screen a single large image in which a plurality of images have been combined, said multiscreen display method comprising:

splitting a plurality of picture signals that indicate said single large image that are supplied as output from a signal generation source into picture signals of said plurality of images for displaying said single large image;

generating display position information such that areas in which projection display areas of said plurality of projectors overlap match with areas that are an object of gradation conversion;

based on said display position information, implementing a non-linear arrangement of gain coefficients for gradation control that is carried out in picture element units;

based on said display position information, adjusting display positions such that areas in which the projection display areas of said plurality of projectors overlap match with areas that are the object of gradation conversion, and implementing, in said picture element units, a luminance level conversion of input signal levels of said plurality of picture signals that have been split using said non-linear arrangement of the gain coefficients for gradation control; and displaying on said screen said plurality of picture signals that have undergone said luminance level conversion.

13. The multiscreen display method according to claim 12, further comprising:

guiding levels between said picture element units using an interpolation circuit, wherein said luminance correction circuit comprises a memory for storing level conversion data for said picture element units.

14. A programmable storage medium tangibly embodying a program of machine-readable instructions executable by a digital processing apparatus to perform a method of operating a multiscreen display system, said method comprising:

displaying on a screen a single large image in which a plurality of images have been combined;

using a luminance correction circuit to implement, in areas in which said plurality of images that are projected onto said screen overlap, a non-linear arrangement of gain coefficients for gradation control that is carried out in picture element units in gradation control areas; and using a gradation conversion look up table (LUT) unit in said luminance correction circuit for adjusting display positions based on display position information from a timing circuit such that areas in which projection display areas of a plurality of projectors overlap match with areas that are an object of gradation conversion, and then implementing, in picture element units, a luminance level conversion of input signal levels of a plurality of picture signals that have been split using the non-linear arrangement of said gain coefficients for gradation control.

15. The programmable storage medium tangibly embodying the program of machine-readable instructions executable by the digital processing apparatus to perform the method of operating the multiscreen display system according to claim 14, said method further comprising:

splitting said plurality of picture signals that indicate said single large image that are supplied as output from a signal generation source into said plurality of picture signals of said plurality of images for displaying said single large image;

using said timing circuit in said luminance correction circuit for generating said display position information such that said areas in which projection display areas of said plurality of projectors overlap match with said areas that are said object of gradation conversion; and using a coefficient arrangement control unit in said luminance correction circuit for, based on said display position information from said timing circuit, implementing said non-linear arrangement of gain coefficients for gradation control that is carried out in picture element units, wherein said plurality of projectors display on said screen said plurality of picture signals that have undergone said luminance level conversion.

16. A programmable storage medium tangibly embodying a program of machine-readable instructions executable by a digital processing apparatus to perform a luminance correction method for use in a multiscreen display system, said method comprising:

using a luminance correction circuit to implement, in areas in which a plurality of images that are projected onto a screen overlap, a non-linear arrangement of gain coefficients for gradation control that is carried out in picture element units in gradation control areas, wherein said multiscreen display system comprises a plurality of projectors for displaying on said screen a single large image in which said plurality of images have been combined, and wherein said gain coefficients are written to a gradation conversion look up table (LUT) unit of said luminance correction circuit that implements, in said picture element units, a luminance level conversion of input signal levels of a plurality of picture signals that have been split using the non-linear arrangement of said gain coefficients for gradation control.

17. The luminance correction method according to claim 16, wherein said gradation conversion look up table (LUT) unit of said luminance correction circuit adjusts display positions based on display position information from a timing circuit.

18. The luminance correction method according to claim 17, wherein the display positions are adjusted such that areas in which projection display areas of said plurality of projectors overlap match with areas that are an object of gradation conversion.

19. The luminance correction method according to claim 17, further comprising using a coefficient arrangement control unit of said luminance correction circuit to, based on said display position information from said timing circuit, implement said non-linear arrangement of said gain coefficients for gradation control that is carried out in said picture element units.

20. A programmable storage medium tangibly embodying a program of machine-readable instructions executable by a digital processing apparatus to perform a multiscreen display method for using a plurality of projectors to display on a screen a single large image in which a plurality of images have been combined, said method comprising:

splitting a plurality of picture signals that indicate said single large image that are supplied as output from a signal generation source into picture signals of said plurality of images for displaying said single large image;

generating display position information such that areas in which projection display areas of said plurality of projectors overlap match with areas that are an object of gradation conversion;

based on said display position information, implementing a non-linear arrangement of gain coefficients for gradation control that is carried out in picture element units;

based on said display position information, adjusting display positions such that areas in which the projection display areas of said plurality of projectors overlap match with areas that are the object of gradation conversion, and implementing, in said picture element units, a luminance level conversion of input signal levels of said plurality of picture signals that have been split using said non-linear arrangement of the gain coefficients for gradation control; and displaying on said screen said plurality of picture signals that have undergone said luminance level conversion.

* * * * *